United States Patent Office 2,908,713
Patented Oct. 13, 1959

2,908,713

DIGUANIDINE DERIVATIVES

Patrick Mamalis, Tadworth, David McHale, Epsom, and Kenneth John Stevens, Ramsgate, England, assignors to Vitamins Limited, London, England, a British company No Drawing. Application November 12, 1957
Serial No. 695,550

Claims priority, application Great Britain November 15, 1956

8 Claims. (Cl. 260—564)

This invention relates to new bactericidal substances and more particularly it relates to new alkyloxybiguanides which possess bactericidal properties and to a process for the manufacture of the said new alkyloxybiguanides.

The new bactericidal substances of the present invention are compounds of the general formula:

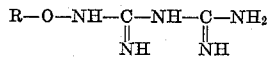

wherein R is a straight or branched chain alkyl radical containing from seven to sixteen carbon atoms inclusive or an aralkyl radical containing from seven to sixteen carbon atoms inclusive and salts thereof.

The preferred compounds are those in which R is an alkyl radical containing from eight to twelve carbon atoms inclusive.

The present invention also includes a process for the manufacture of the novel bactericidal substances of the present invention, which comprises reacting an O-alkyl hydroxylamine hydrohalide or O-aralkyl hydroxylamine hydrohalide of the general formula:

$$R-O-NH_2, HX$$

wherein R has the meaning stated above and X is chlorine, bromine or iodine, with dicyandiamide.

The new substances are useful as bactericides and possess high activity when tested in vitro against the organisms *Staphylococcus aureus*, *Streptococcus pyogenes*, *Corynebacterium diphtheria*, *Escherichia coli*, *Pseudomonas aeruginosa*, *Eberthella typhosa* and *Klebsiella pneumoniae*. Because of their high degree of anti-bacterial activity, the new substances are useful for many purposes, for example in medical and surgical practice for sterilisation of instruments and body tissues and for general preservative purposes.

The following examples, in which the parts are by weight, illustrate the invention:

Example 1

100 parts of O-n-decylhydroxylamine hydrochloride, 46 parts of dicyandiamide and 350 parts of ethyl alcohol were stirred together for two hours under reflux. The mixture was cooled, filtered, the insoluble part rejected and the filtrate concentrated to half volume. Addition of ether or ethyl acetate brought about the separation of N-n-octyloxy-diguanide hydrochloride, M.P. 123–124° C. Treatment of the hydrochloride in water with aqueous sodium hydroxide yielded N-n-octyloxydiguanide which crystallised from alcohol as white needles, M.P. 99–100° C.

Example 2

100 parts of O-n-decylhydroxylamine hydrochloride, 41 parts of dicyandiamide and 350 parts of ethyl alcohol were stirred together for two hours under reflux. After the mixture had been cooled, it was filtered from a small quantity of insoluble material and the filtrate evaporated. The solid residue was dissolved in warm water and made alkaline with aqueous sodium hydroxide to yield N-n-decyloxydiguanide, M.P. 100–101° C.

Example 3

130 parts of O-n-tetradecylhydroxylamine hydrochloride, 44 parts of dicyandiamide and 500 parts of ethyl alcohol were stirred together under reflux for 2½ hours. The clear solution was evaporated, the residue stirred with dry ether and collected. N-n-tetradecyloxydiguanide hydrochloride formed needles from a mixture of ethyl alcohol and ether, softening at 75° C. and melting at 140° C.

Example 4

210 parts of O-n-heptylhydroxylamine hydrobromide, 85 parts of dicyandiamide and 500 parts of ethyl alcohol were stirred together under reflux for two hours. Addition of dry ether and cooling brought about the separation of N-n-heptyloxydiguanide hydrobromide, a deliquescent solid characterized as the crystalline picrate, M.P. 210° C.

The following table shows further examples of the present invention made in a manner similar to that described in the preceding examples.

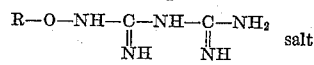 salt

| Example No. | R | Salt | Softening Point, °C. | Melting Point, °C. |
|---|---|---|---|---|
| 5 | n-C₇H₁₅ | picrate | | 210 |
| 6 | n-C₈H₁₇ | base | | 99–100 |
| 7 | | | HCl | 90 | 123–124 |
| 8 | | | picrate | 205 | 209 |
| 9 | n-C₉H₁₉ | picrate | | 200 |
| 10 | | base | | 90 | 100–101 |
| 11 | n-C₁₀H₂₁ | 2 HCl | | 123–130 |
| 12 | | picrate | | 95 | 204–205 |
| 13 | n-C₁₁H₂₃ | 2 HCl | | 138 | 145–148 |
| 14 | sec-C₁₁H₂₃ | HCl | 85 | 105–108 |
| 15 | n-C₁₂H₂₅ | 2HCl | 70 | 162–164 |
| 16 | | picrate | | 207–208 |
| 17 | n-C₁₄H₂₉ | HCl | 75 | 138–140 |
| 18 | | picrate | | 210–212 |
| 19 | n-C₁₆H₃₃ | base | | 101–103 |
| 20 | n-C₁₆H₃₃ | HCl | 85 | ca. 120 |
| 21 | C₆H₅.CH₂ | base | 110 | |
| 22 | | 2 HCl | 146–147 | |
| 23 | 1-naphthyl-methyl | base | | 145 |
| 24 | 2-naphthyl-methyl | base | | 213 |
| 25 | 4-methyl-benzyl | base | | 177 |
| 26 | 4-chlorobenzyl | base | | 175 |
| 27 | 4-bromobenzyl | base | | 188 |

The hydrochlorides are in general deliquescent and do not possess sharp melting points.

What we claim is:

1. Compounds of the group consisting of diguanidines and diguanidine salts, said diguanidines having the general formula:

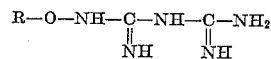

wherein R is selected from the group consisting of alkyl radicals containing from seven to sixteen carbon atoms inclusive and aralkyl radicals containing from seven to sixteen carbon atoms inclusive.

2. A compound according to claim 1, wherein R is an alkyl radical containing eight carbon atoms.

3. A process for the manufacture of compounds of the group consisting of diguanidines and diguanidine salts, said diguanidines having the general formula:

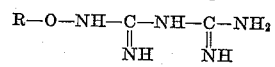

wherein R is selected from the group consisting of alkyl radicals containing from seven to sixteen carbon atoms inclusive and aralkyl radicals containing from seven to sixteen carbon atoms inclusive, which comprises reacting a compound of the general formula R—O—NH$_2$,HX, where X is a halogen selected from the group consisting of chlorine, bromine and iodine, with dicyandiamide.

4. A process for the manufacture of compounds of the group consisting of diguanidines and diguanidine salts, said diguanidines having the general formula:

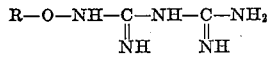

wherein R is an alkyl radical containing from eight to twelve carbon atoms, which comprises reacting a compound of the general formula R—O—NH$_2$,HX, where X is a halogen selected from the group consisting of chlorine, bromine and iodine, with dicyandiamide.

5. A compound according to claim 1, wherein R is an alkyl radical containing nine carbon atoms.

6. A compound according to claim 1, wherein R is an alkyl radical containing ten carbon atoms.

7. A compound according to claim 1, wherein R is an alkyl radical containing eleven carbon atoms.

8. A compound according to claim 1, wherein R is an alkyl radical containing twelve carbon atoms.

References Cited in the file of this patent

Fuller et al.: J. Chem. Soc. (1947), pp. 963–9.
Curd et al.: J. Chem. Soc., p. 733 (1946).
Frear et al.: J. of Economic Entomology, vol. 40, pp. 736–741 (1947).